(12) United States Patent
Zhao

(10) Patent No.: US 12,307,864 B2
(45) Date of Patent: May 20, 2025

(54) DISPOSABLE RFID COMPONENT FOR CABLE LOCK

(71) Applicant: Shenzhen Wins Electronic Technology Co., Ltd., Shenzhen (CN)

(72) Inventor: Shengfei Zhao, Shenzhen (CN)

(73) Assignee: Shenzhen Wins Electronic Technology Co., Ltd., Shenzhen (CN)

( * ) Notice: Subject to any disclaimer, the term of this patent is extended or adjusted under 35 U.S.C. 154(b) by 70 days.

(21) Appl. No.: 18/243,277

(22) Filed: Sep. 7, 2023

(65) Prior Publication Data

US 2024/0371243 A1 Nov. 7, 2024

(30) Foreign Application Priority Data

May 4, 2023 (CN) .......................... 202310493563.8

(51) Int. Cl.
*G08B 13/14* (2006.01)
*G06K 19/07* (2006.01)
*G08B 13/24* (2006.01)

(52) U.S. Cl.
CPC ..... *G08B 13/1463* (2013.01); *G06K 19/0723* (2013.01); *G08B 13/2434* (2013.01)

(58) Field of Classification Search
CPC ............ G08B 13/1463; G08B 13/2434; G08B 13/1445; G08B 13/12
See application file for complete search history.

(56) References Cited

U.S. PATENT DOCUMENTS

| | | | | |
|---|---|---|---|---|
| 7,239,238 B2 * | 7/2007 | Tester | ................... | G09F 3/0335 |
| | | | | 292/307 R |
| 7,616,116 B2 * | 11/2009 | Ehrensvard | ........... | G09F 3/0358 |
| | | | | 340/568.1 |
| 9,076,312 B2 * | 7/2015 | Teeter | .............. | G06K 19/07798 |
| 9,818,273 B2 * | 11/2017 | Nekoogar | .............. | G08B 13/06 |
| 10,407,116 B2 * | 9/2019 | Mohamed | .............. | B62H 5/147 |
| 11,403,971 B2 * | 8/2022 | Grapsa | .................. | G09F 3/0352 |
| 11,741,330 B2 * | 8/2023 | Zhao | .................. | G07C 9/00944 |
| | | | | 340/572.1 |
| 2010/0231388 A1 * | 9/2010 | Shute | ................. | G08B 13/2448 |
| | | | | 340/568.4 |

FOREIGN PATENT DOCUMENTS

CN 102923415 A 2/2013

* cited by examiner

*Primary Examiner* — John A Tweel, Jr.
(74) *Attorney, Agent, or Firm* — Birchwood IP

(57) ABSTRACT

A disposable RFID component for a cable lock includes an RFID device and a lock body part. The lock body part is a part of a complete lock body of the cable lock. There are following beneficial effects. The traditional integrated lock body is separated into two parts, in which one part is a relatively low-cost RFID component, and the other part is a relatively high-cost locating component. Thereby, the RFID component is disposable after a single use, and a new RFID component can be assembled with a recycled relatively high-cost locating component to form a new cable lock. As such, the locating function can be realized with use cost reduced as much as possible.

17 Claims, 12 Drawing Sheets

DISPOSABLE RFID COMPONENT FOR CABLE LOCK

CROSS-REFERENCE TO RELATED APPLICATIONS

This is a U. S. patent application which claims the priority and benefit of Chinese Patent Application Number 202310493563.8, filed on May 4, 2023, the disclosure of which is incorporated herein by reference in its entirety.

TECHNICAL FIELD

The present application relates to a cable lock, in particular to a disposable Radio Frequency Identification (RFID) component in the cable lock.

BACKGROUND

Cable locks are mainly used for locking containers. At present, there exist two types of cable locks. With one type of cable lock, one can check whether the metal cable had been cut only by naked eyes. With the other type of cable lock, one can check whether the lock had been unlocked by the uploaded data through RFID tags after the metal cable had been cut.

The above two types of cable locks do not have real-time locating and real-time signal sending functions. The specific function of the electronic cable lock and its usage under specified scenes cannot be realized.

The inventor fails to find any commercially available products that can meet the above requirements. In addition, according to the inventor's search and analysis of the prior art, only some introductions of technologies with real-time locating and status-sending modules are found, such as the patent publication No. CN102923415A, entitled "Container door multi-frequency safety electronic label seal and monitor method thereof" filed by the applicant "Sheng Jun" on Nov. 12, 2012.

However, the patent publication is aimed at the multi-frequency security electronic signature seal of the door, which is mainly composed of a signature seal body and a U-shaped metal lock rod, not used in a cable lock, and the communication module of its GPS module is integrally arranged on the electronic signature seal, thus the production and use cost is too high to be implemented as a specific product.

In the practical use scenario, each container needs a cable lock, so the demand for cable locks in logistics and transportation are huge, which poses huge demand for cable locks. Therefore, it is important to realize the locating function in the locks without significantly increasing the cost in the industry, in view of the huge demand for cable locks.

SUMMARY

In order to at least alleviate the related problems in the prior art, in a disclosure of the present application an RFID component for a cable lock is provided.

In an embodiment of the disclosure, a disposable RFID component for a cable lock includes an RFID device and a lock body part. The lock body part is a part of a complete lock body of the cable lock.

In an embodiment, the lock body is provided with a detachable structure. The detachable docking structure can be selected from a variety of docking structures, such as plug-in connectors, threaded connectors and other structures.

In an embodiment, the detachable docking structure is a T-shaped guide rail. The arrangement in which the T-shaped guide rail is provided at the upper end can form an enclosed structure, which is waterproof and has great advantages over the arrangement in which the T-shaped slider is provided at the upper end.

In an embodiment, the detachable docking structure is a T-shaped slider. The T-shaped slider is arranged at the lower end, so that a raised boss structure far away from the water inlet gap can be formed, and the detachable docking structure has the function of preventing internal water inlet caused by rain.

In an embodiment, an end of the T-shaped slider is provided with a position limit step. To realize the firm integration of the two devices, it is necessary to realize the firm integration of the upper, lower, left, and right directions between the two devices. In this embodiment, the T-shaped guide rail is integrated with the position limit step to realize the fixation of three directions, and then the cable is inserted to realize the fixation of the four directions, that is, the T-shaped guide rail is a preferred solution selected when several methods are considered.

In an embodiment, the lock body part is provided with an inner cavity. The RFID device is arranged within the inner cavity of the lock body part.

In an embodiment, the lock body part is provided with a battery therein. The position where the battery is arranged can be adjusted as required. The battery may or may not be arranged within the inner cavity. It is apparent that, instead of being arranged within the lock body of this part, the battery can be arranged in the lock body of another part, as long as the power supply can be realized.

In an embodiment, the lock body part is provided with a connector.

In an embodiment, the connector is electrically connected with the battery and the RFID device respectively.

In an embodiment, the connector is a pogo pin interface or an electrically conductive plate corresponding to the pogo pin interface.

In an embodiment, the lock further includes a metal cable, and an end of the metal cable is fixed on the lock body part.

In an embodiment, the lock body has a through hole through which the metal cable passes.

In an embodiment, the lock includes a metal cable and a through hole through which the metal cable passes through. The through hole and the fixed end of the metal cable are respectively arranged on the left and right sides of the lock body part.

In an embodiment, the metal cable is a steel cable.

In an embodiment, the lock body is provided with a microswitch connected with the positive electrode of the battery. The microswitch acts as a power switch.

In an embodiment, the lock body part is provided with a lock core.

In an embodiment, the lock core is arranged within the through hole.

In an embodiment, both the lock core and the microswitch are positioned at the same side of the lock body part.

In an embodiment, the lock core is positioned at the same side as the microswitch, and is positioned at a lower end of the microswitch.

In an embodiment, the metal cable is a steel cable. The lock body part is provided with a detachable docking structure which is a T-shaped guide rail or a T-shaped slider.

The end of the T-shaped slider is provided with a position limit step. The lock body part is provided with an inner cavity. The RFID device is arranged within the inner cavity of the lock body part. A battery is also arranged in the inner cavity. A connector is arranged on the lock body part. The connector is electrically connected with the RFID device. The connector is a pogo pin interface or an electrically conductive plate corresponding to the pogo pin interface.

In an embodiment, the lock body part is provided with a detachable docking structure which is a T-shaped guide rail or a T-shaped slider. The end of the T-shaped slider is provided with a position limit step. The lock body part is provided with an inner cavity. The RFID device is arranged within the inner cavity of the lock body part. A battery is also arranged in the inner cavity. A connector is arranged on the lock body part. The connector is electrically connected with the RFID device. The connector is a pogo pin interface or an electrically conductive plate corresponding to the pogo pin interface. The RFID component further includes a metal cable. An end of the metal cable is fixed on the lock body part. The lock body part is provided with a through hole through which the metal cable passes through. The through hole and the fixed end of the metal cable are respectively arranged at the left and right ends of the lock body part. The metal cable is a steel cable. The lock body part is provided with a microswitch. The lock body part is provided with a lock core thereon. The lock core is positioned at the same side with the microswitch, and is positioned at the lower end of the microswitch.

There are following beneficial effects in the disclosure. Through the above embodiments, the traditional integrated lock body is separated into two parts, in which one part is a relatively low-cost RFID component, and the other part is a relatively high-cost locating component. Thereby, the RFID component is disposable after a single use, and a new RFID component can be assembled with a recycled relatively high-cost locating component to form a new cable lock. As such, the locating function can be realized with use cost reduced as more as possible.

BRIEF DESCRIPTION OF DRAWINGS

In order to illustrate the technical solutions in the embodiments of the disclosure, the drawings related to the description of the embodiments will be briefly introduced below. It is apparent that, the drawings described below are only some embodiments of the disclosure. Those having ordinary skills in the art can derive other solutions according to these drawings without devoting creative effort.

DETAILED DESCRIPTION

Figure 1:
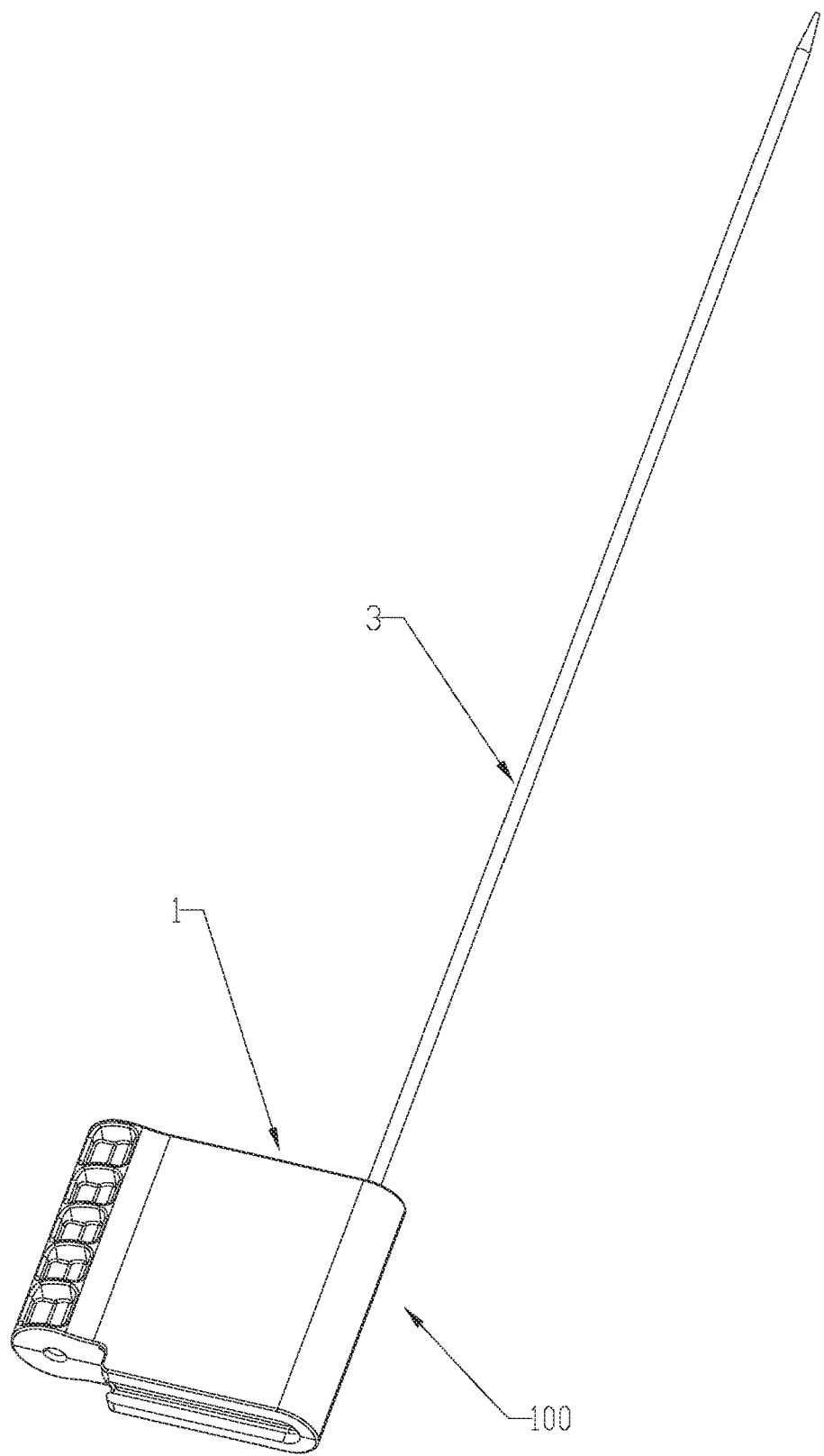
FIG. 1 depicts a schematic diagram showing a disposable RFID component for a cable lock according to an embodiment of the disclosure.

It should be noted that the embodiments of the disclosure and the features in the embodiments may be freely combined with each other without conflict.

In the description of the disclosure, it should be understood that the terms "center", "longitudinal", "lateral", "up", "down", "front", "rear", "left", "right", "vertical", "horizontal", "top", "bottom", "inside", "outside", etc. indicate the orientation or position relationship based on the orientation or position relationship shown in the drawings, and are only for the convenience of describing the disclosure and simplifying the description, rather than indicating or implying that the device or component referred to must have a specific orientation, be constructed and operated in a specific orientation. And thus, those terms shall not be understood as a limitation on the scope of protection of the disclosure. In addition, the terms "first" and "second" are only illustrative, and it is not intended to be interpreted as indicating or implying relative importance or implicitly indicating the number of indicated technical features. Thus, the features defined as "first", "second" and so on may explicitly or implicitly include one or more of the features referred to. In the description of the disclosure, unless otherwise specified, "plurality" means two or more.

In the description of the disclosure, it should be noted that unless otherwise specified and limited, the terms "mount", "connected" and "connection" should be broadly understood. For example, the connection can be a fixed connection, detachable connection or integrated connection. And the connection can be a direct connection, can also be an indirect connection through an intermediate media, and can be a connection inside two elements. The specific meanings of the above terms in the disclosure can be understood through specific situations, by those having ordinary skills in the art.

The disclosure will be further illustrated in conjunction with the attached drawings and specific embodiments.

Embodiment One

FIG. 1 depicts a RFID component for a disposable cable lock. The lock includes a disposable 100 which can be discarded after use.

The disposable 100 includes a lock body part which is a part of a complete lock body of a complete cable lock and can be assembled with another part to form a complete lock body of a complete cable lock.

The lock body part is also called the first lock body 1. The first lock body 1 is provided with an RFID device 12 and a detachable structure 4.

The detachable structure adopts a detachable docking structure 4. The detachable docking structure 4 is a T-shaped guide rail 41 arranged at the bottom of the first lock body 1.

When assembled with another part, the T-shaped guide rail 41 is positioned at the upper end, which can form a waterproof wrapping structure.

The detachable docking structure 4 can also be a T-shaped slider. The arrangement in which the T-shaped slider is provided at the lower end can form a raised boss structure distal to the water inlet gap, and has a waterproof effect.

An end of the T-shaped slider is provided with a position limit step.

The first lock body 1 is provided with an inner cavity. The RFID device 12 is arranged within the inner cavity of the first lock body 1. A battery is also arranged within the inner cavity.

The position where the battery is arranged can be adjusted as required. The battery may or may not be arranged within the inner cavity. It is apparent that, instead of being arranged within the lock body of this part, the battery can be arranged in the lock body of another part, as long as the power supply can be realized.

The battery is preferably a small button battery 14.

The battery is electrically connected with the RFID device 12. The first lock body 1 is provided with a connector that is electrically connected with the RFID device 12 and the battery respectively. The connector is a pogo pin interface.

The RFID component further includes a metal cable.

The metal cable is preferably a steel cable 3. Alternatively, the metal cable may be a cable of another metal material.

An end of the metal cable is fixed on the first lock body 1. The first lock body 1 is provided with a power microswitch 13 for triggering the power supply. The power microswitch 13 is triggered when the metal cable passes through the first lock body 1. The first lock body 1 is both provided with a through hole through which metal cable 3 passes.

Embodiment Two

The RFID component applied to the cable lock, and the cable lock including the RFID component are illustrated in this embodiment based on embodiment one.

Figure 2:
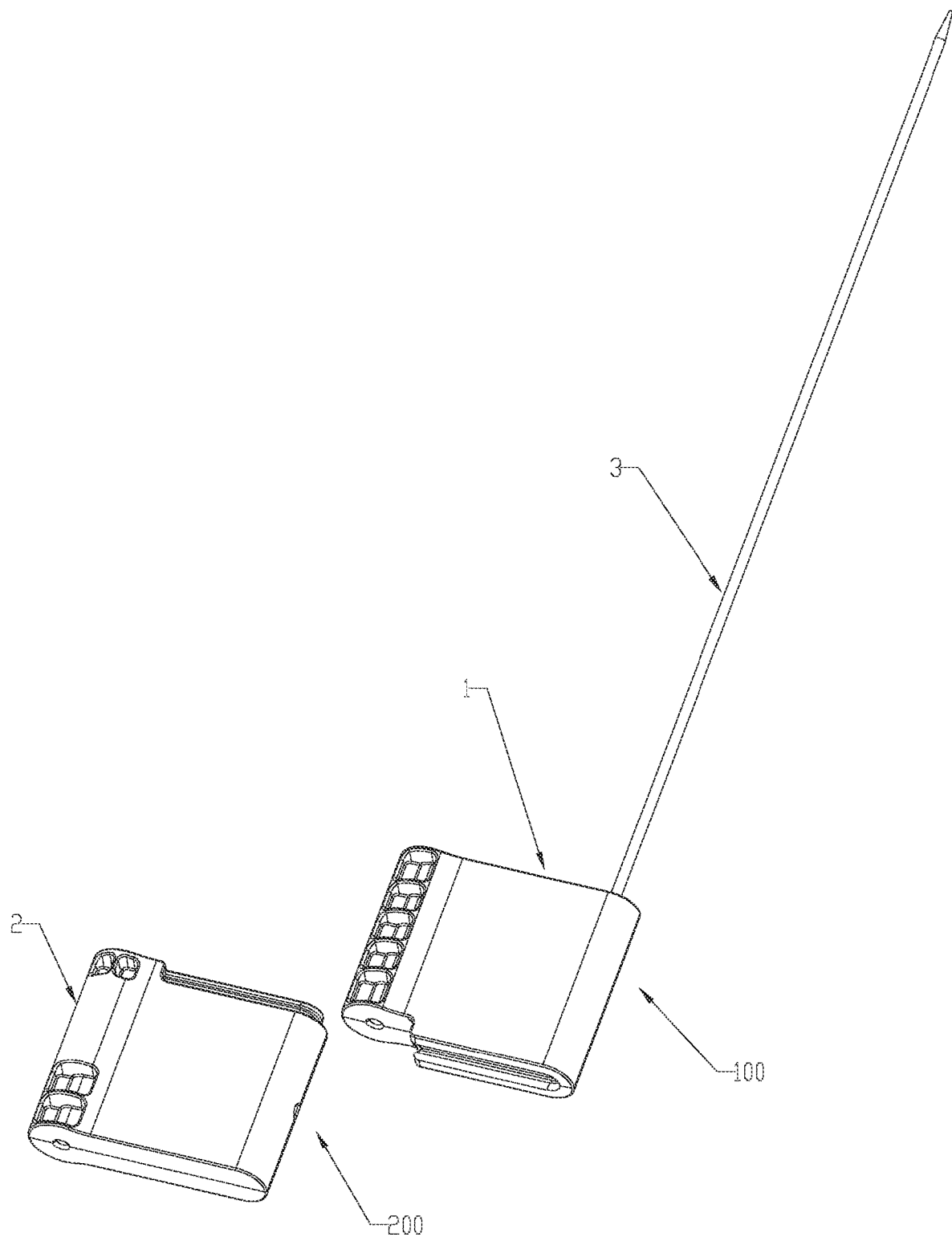
FIG. 2 depicts a schematic diagram showing the use of the disclosure.

As shown in FIG. 2, the cable lock with locator mainly includes two parts, i.e., a disposable part 100 which can be discarded after use, and a recyclable part 200 which can be reused.

The disposable part 100 includes a metal cable and a first lock body 1. The first lock body 1 preferably has a square upper housing 11.

The metal cable is preferably a steel cable 3. Alternatively, the metal cable may be a cable of another metal material.

The recyclable part 200 includes a second lock body 2. The second lock body 2 preferably has a square lower housing 21.

The first lock body 1 and the second lock body 2 respectively represent a part of the lock body, where the term "first" and "second" are only intended to distinguish different parts of the lock body, and are not intended to imply an order.

The first lock body 1 and the second lock body 2 are assembled to form a complete lock body of a cable lock.

Figure 3:
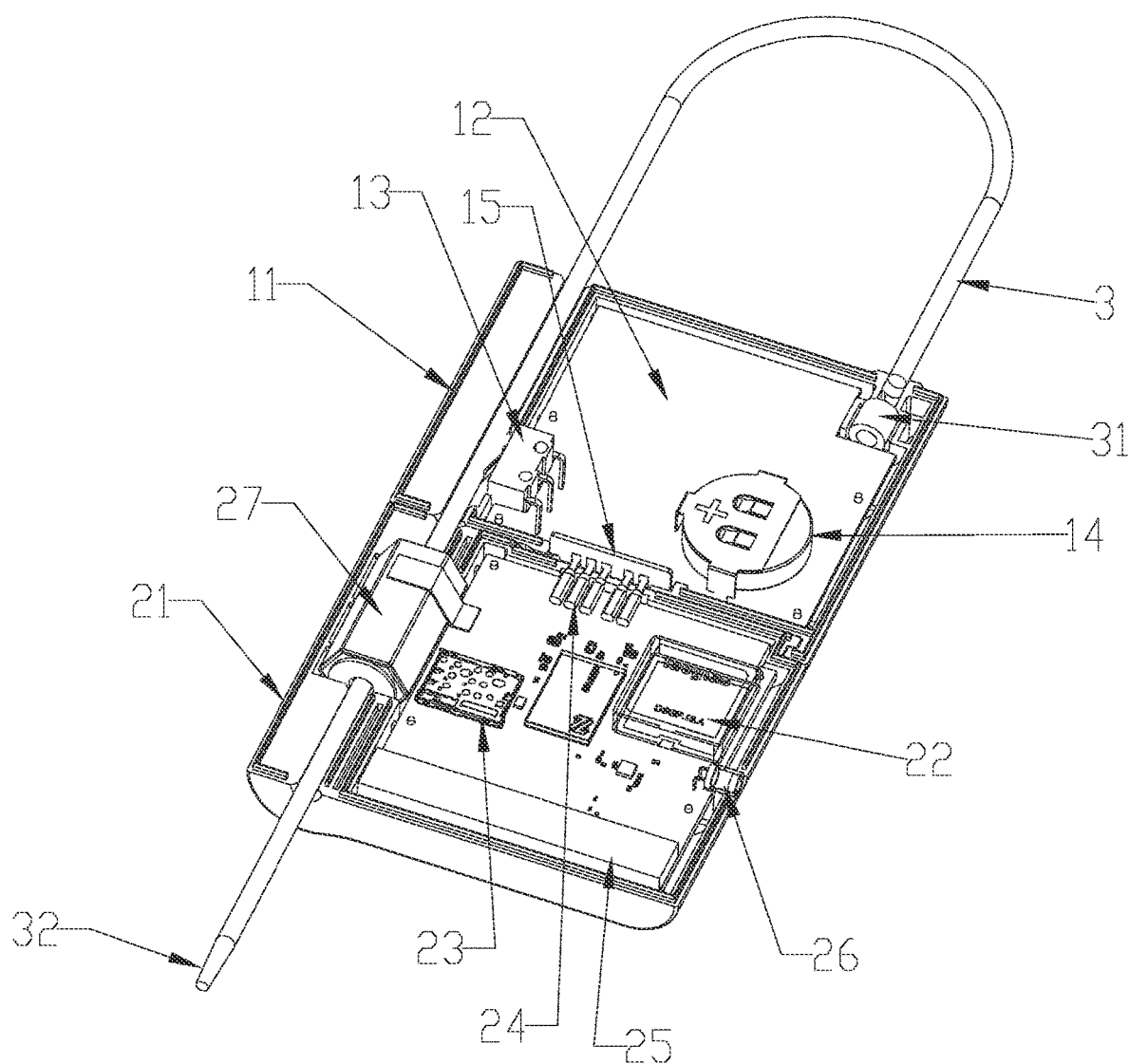
FIG. 3 depicts a schematic diagram showing the internal structure according to an embodiment of the disclosure.

As shown in FIG. 3, the first lock body 1 is provided with an RFID device 12. The second lock body 2 is provided with a locator 22. The first lock body 1 and the second lock body 2 can be integrated into one piece by a detachable structure to form a complete lock body of a cable lock.

The second lock body 2 is provided with a data transmitter 23 that is electrically connected with the locator 22. The real-time locating information of the locator 22 can be wirelessly transmitted to a remote terminal device through the data transmitter 23. For example, the locator 22 can transmit the real-time locating information to a client or a background server through the data transmitter 23. The client can be a mobile phone or a handheld device of a user.

Figure 4:
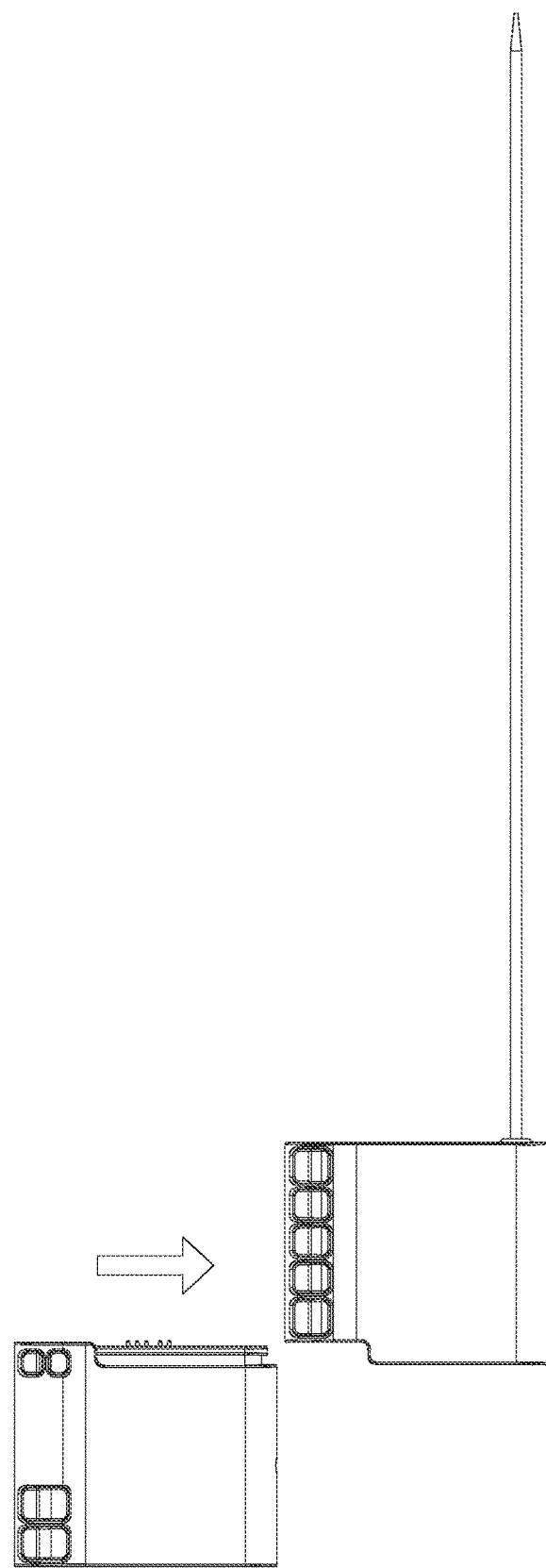
FIG. 4 depicts a schematic diagram showing the assembling process according to an embodiment of the disclosure.

As shown in FIG. 4, the first lock body 1 and the second lock body 2 can be connected through a detachable structure.

Figure 5:
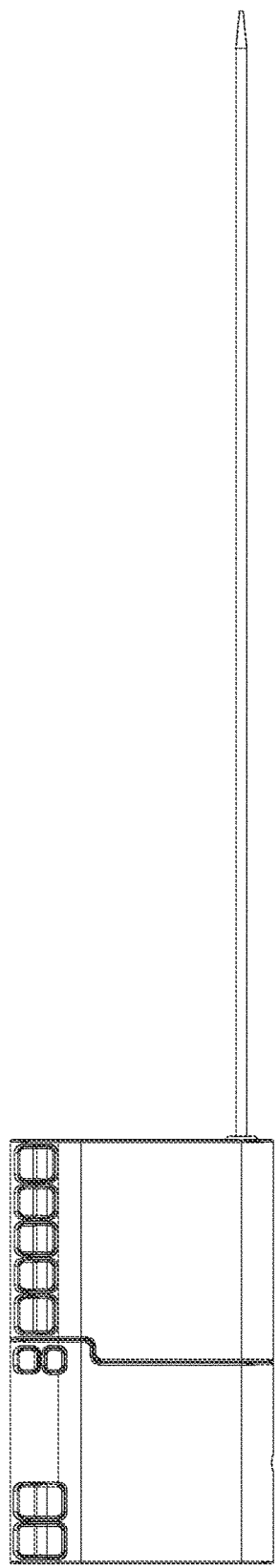
FIG. 5 depicts a schematic diagram showing the assembling process according to an embodiment of the disclosure.

As shown in FIG. 5, the first lock body 1 and the second lock body 2 are connected to form a cable lock that is in an unlocked state.

Figure 6:
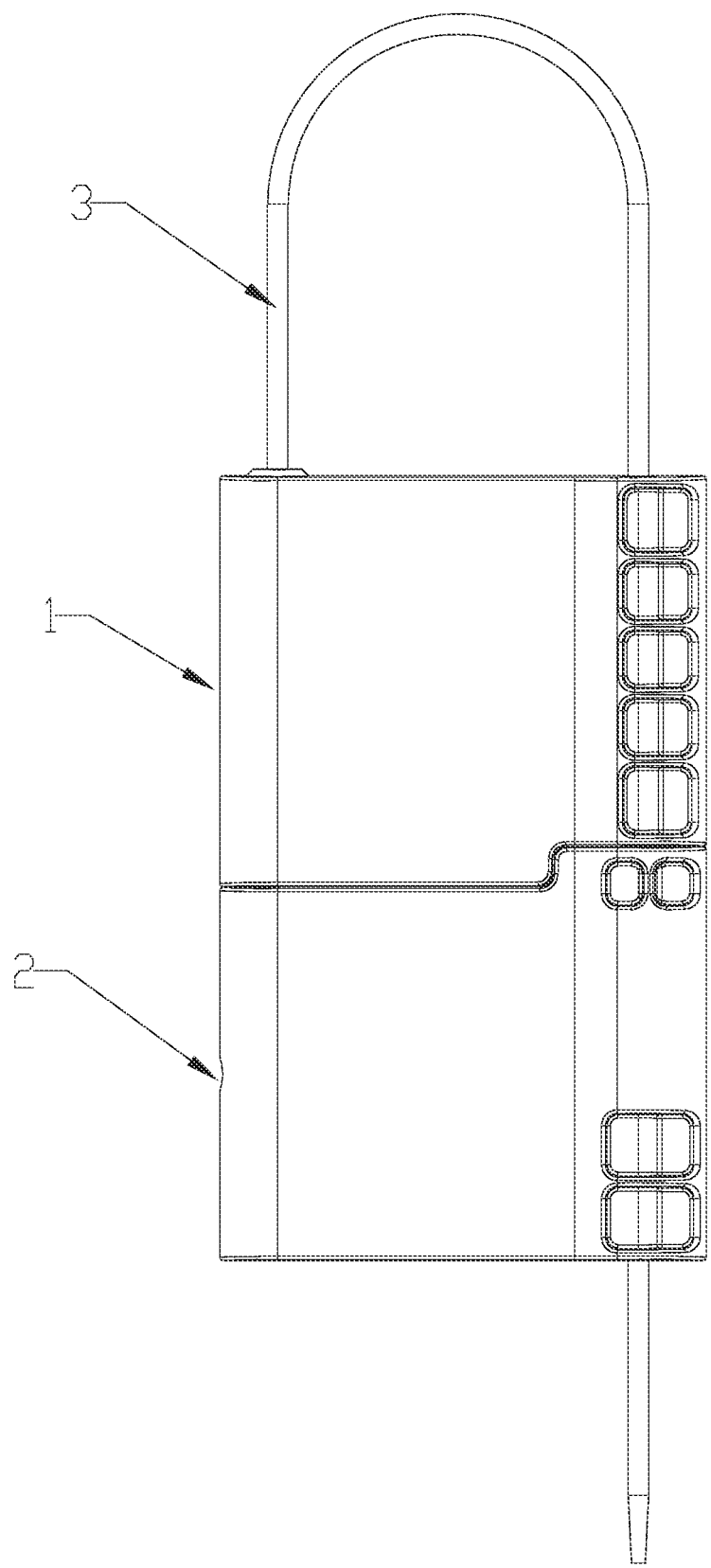
FIG. 6 depicts a schematic diagram showing the assembling process according to an embodiment of the disclosure.

As shown in FIG. 6, once the steel cable 3 passes through the first lock body 1 and then through the second lock body 2, the steel cable 3 can be locked thereby. Unlocking will not be possible unless steel cable 3 is cut off.

Once the steel cable 3 is cut off, the disposable part 100 is destroyed and can only be discarded. But the recyclable part 200 is not destroyed, which can be assembled with a new disposable part 100 through a detachable structure to form a new cable lock such that the recyclable part 200 is recycled and reused. Thereby, the locating function of the cable lock is achieved while the cost is effectively controlled, such that the cost of the lock is decreased, which is beneficial to the large-scale deployment of the lock.

The cable lock is locked on the container, such that the location information of the goods within the locked container is monitored in real-time.

Embodiment Three

In this embodiment, the transmission of electrical signals between the disposable part 100 and the recyclable part 200 of the cable lock is improved based on embodiment two.

As shown in FIG. 3, the RFID device 12 is electrically connected with the data transmitter 23, so that the information of the RFID device 12 can be transmitted through the data transmitter 23, and the status of the RFID device 12 can be known remotely.

The first lock body 1 is provided with a battery for supplying power to the RFID device 12, the locator 22 and the data transmitter 23. Since the first lock body 1 has more free space, mounting the battery in the first lock body 1 is more conducive to the rational use of space.

The battery is preferably a small button battery 14.

The battery can be a rechargeable battery or a non-rechargeable battery.

The first lock body 1 is provided with a first connector. The second lock body 2 is provided with a second connector. When the first lock body 1 and the second lock body 2 are integrated into one piece, the first connector is communicatively connected with the second connector, thereby realizing the transmission of electric signals between the disposable part 100 and the recyclable part 200.

The RFID device 12 is electrically connected with the first connector. The locator 22 and the data transmitter 23 are electrically connected with the second connector.

Figure 7:
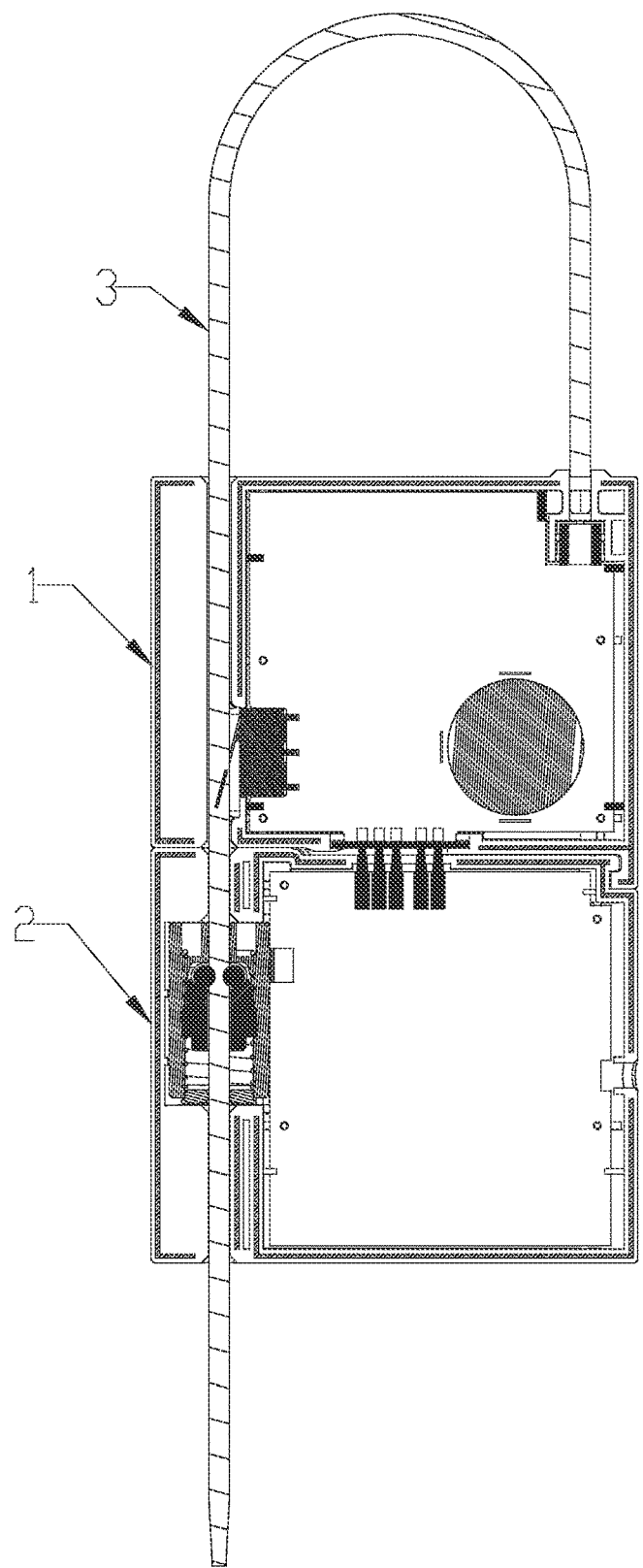
FIG. 7 depicts a schematic diagram showing the internal structure according to an embodiment of the disclosure.
Figure 8:
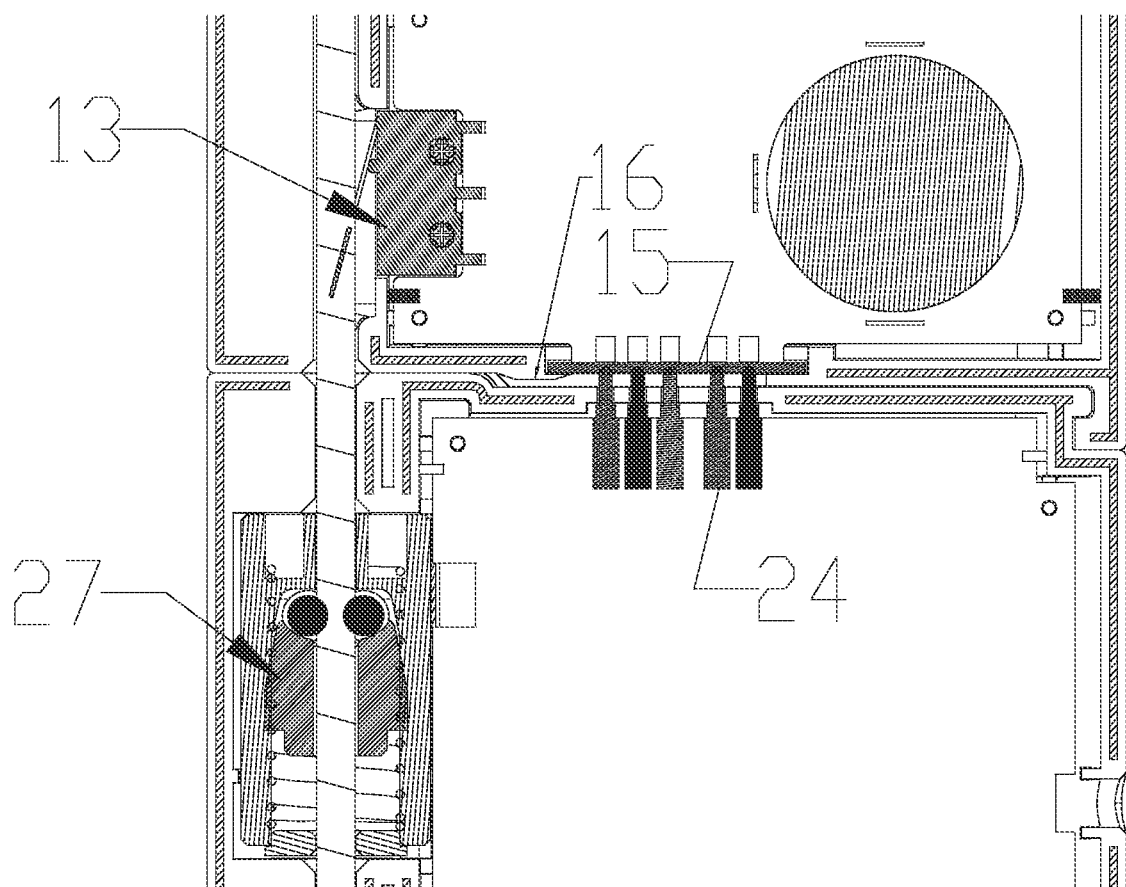
FIG. 8 depicts an enlarged schematic diagram showing an interior according to an embodiment of the disclosure.

As shown in FIGS. 7 and 8, the second connector is a pogo pin interface 24. The first connector is an electrically conductive sheet 15 which is in electrical connection and fits with the pogo pin interface 24. The first lock body 1 is provided with a guiding plate 16 which allows the pogo pin interface 24 to be released and compressed smoothly and flexibly. As the first lock body 1 and the second lock body 2 are connected through a detachable structure, the pogo pin interface 24 slides in and electrically connects the electrically conductive sheet 15 with the help of the guiding plate 16. Thereby, the transmission of electrical signals between the disposable part 100 and the recyclable part 200 is achieved, and power supply and communication between the two devices can be achieved through the pogo pin interface.

The guiding plate 16 includes a guide-in slope for guiding the pogo pin interface 24 in and a guide-out slope for guiding the pogo pin interface 24 out.

The guiding plate 16 is preferably in the shape of an isosceles trapezoid.

The second lock body 2 is provided with an antenna 25 that is electrically connected with the data transmitter 23.

The second lock body 2 is provided with an indicator light 26 for state indication, such as the activation of the power supply.

Embodiment Four

In this embodiment, the arrangement of the power supply is modified based on embodiment three.

The position where the battery is mounted is adjusted from the first lock body 1 to the second lock body 2. In such an arrangement, the battery directly supplies power to the locator 22 and the data transmitter 23, and then supplies power to the RFID device 12 through the connector.

Embodiment Five

The position of the connector is modified based on embodiment three.

A pogo pin interface is mounted on the first lock body 1. And an electrically conductive sheet is mounted on the second lock body 2.

Embodiment Six

In this embodiment, the locator 22 and the data transmitter 23 are selected on the basis of embodiment two.

The locator 22 can be a Galileo, GPS, Beidou positioning system or other positioning systems.

The data transmitter 23 may be a GSM device, a GPRS device or other wireless transmitters.

Embodiment Seven

In this embodiment, the detachable structure is illustrated in detail based on embodiment two.

Figure 9:
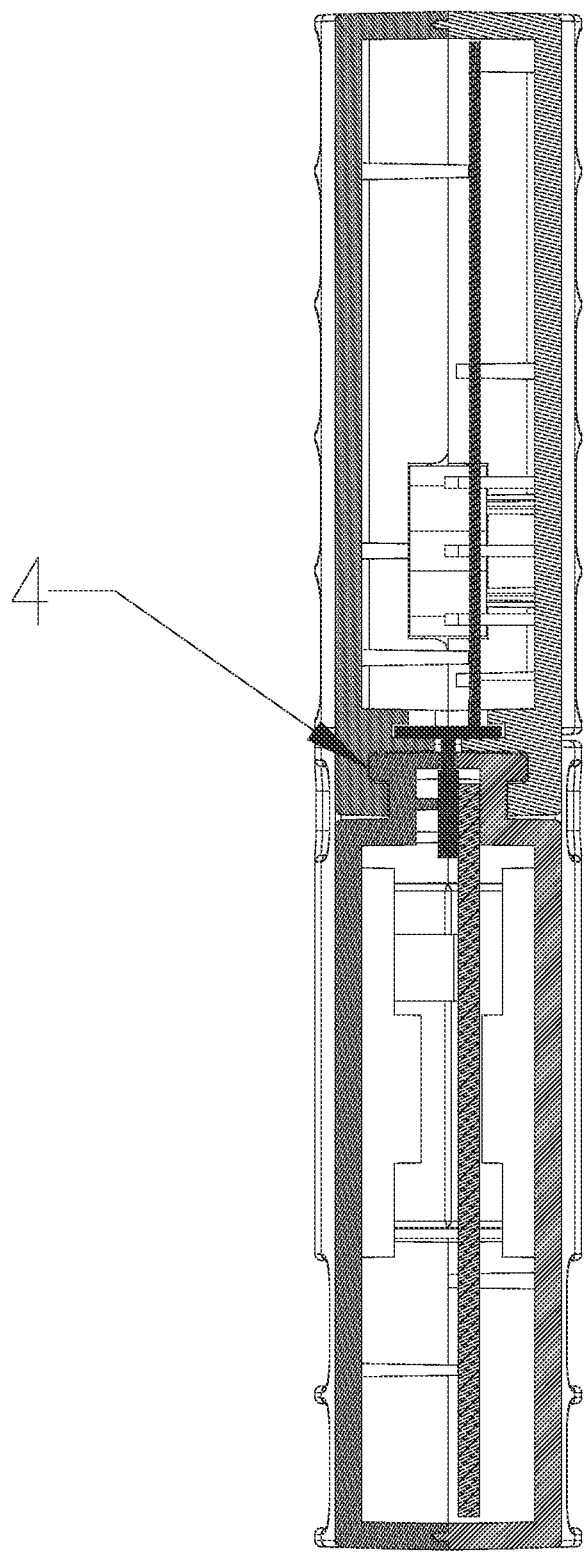
FIG. 9 depicts a schematic diagram showing the detachable docking structure according to an embodiment of the disclosure.
Figure 10:
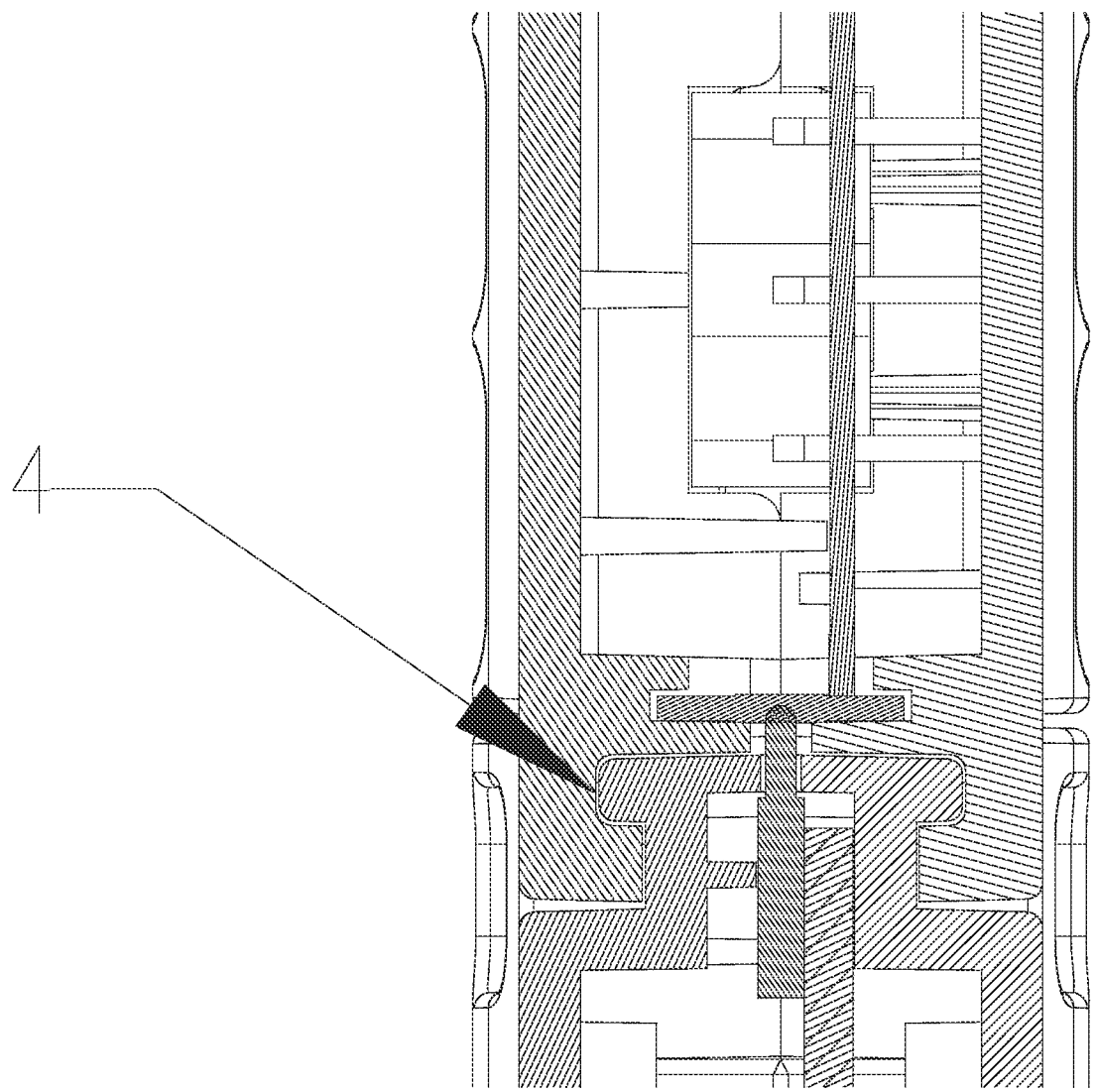
FIG. 10 depicts an enlarged schematic diagram showing the detachable docking structure according to an embodiment of the disclosure.

As shown in FIGS. 9 and 10, the detachable structure is a detachable docking structure 4 which can be matched with the steel cable 3 to form a stable upper and lower device.

Figure 11:
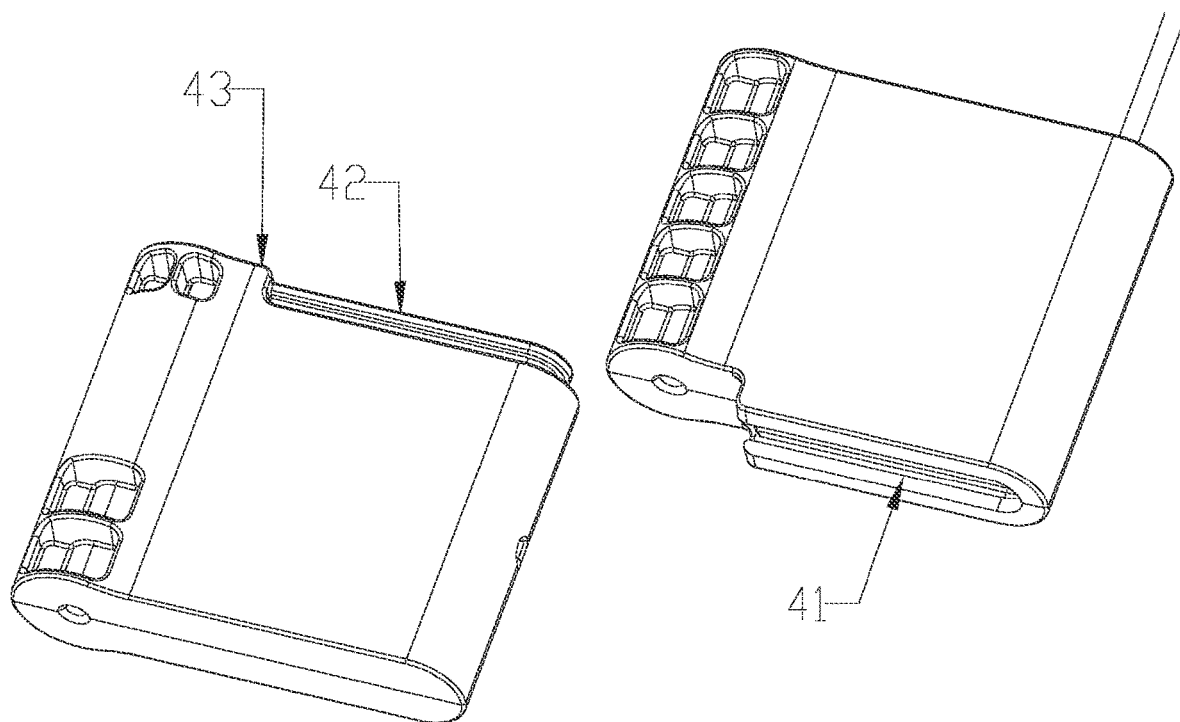
FIG. 11 depicts a schematic diagram showing the detachable docking structure according to an embodiment of the disclosure.
Figure 12:
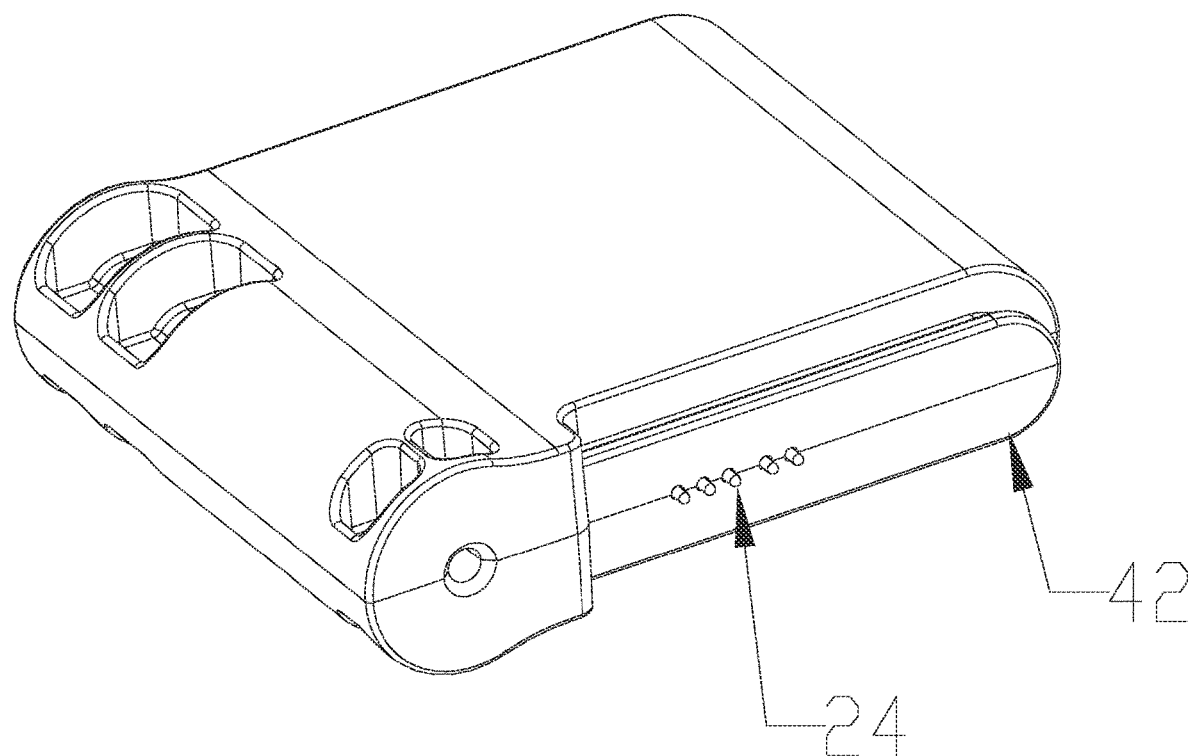
FIG. 12 depicts a schematic diagram showing a pogo pin interface according to an embodiment of the disclosure.

As shown in FIGS. 11 and 12, the detachable docking structure 4 includes a T-shaped guide rail 41, and a T-shaped slider 42 in sliding fits with the T-shaped guide rail 41.

The T-shaped guide rail 41 is arranged on the first lock body 1. The T-shaped slider 42 is arranged on the second lock body 2.

As shown in FIG. 12, the pogo pin interface 24 is mounted on the detachable docking structure 4. In particular, the pogo pin interface 24 can be mounted on the T-shaped slider 42, which can synchronously complete the docking of the connector when the lock body is docked.

As shown in FIG. 10, the T-shaped guide rail 41 is arranged above, the T-shaped slider 42 is arranged below, and the pogo pin interface 24 is mounted on the T-shaped slider 42, so that water can be prevented from entering the joint of the pin. That is, the T-shaped guide rail 41 acts as a waterproof wrap around the pogo pin interface 24, such that an enclosed space is thus formed. The pogo pin interface 24 is raised above the water inlet by the T-shaped slider 42. That is, the pogo pin interface 24 is mounted on a raised platform which is higher than the butt joint of the T-shaped guide rail 41 and the T-shaped slider 42. As such, when water flows from top to bottom, the water can enter the butt joint of the T-shaped guide rail 41 and the T-shaped slider 42 at most, but the water would not enter the space where the pogo pin interface 24 is located. Thereby, the rain-proof requirements of products are met.

The pogo pin interface 24 may also be mounted on the T-shaped guide rail 41.

As shown in FIG. 11, a position limit step 43 is provided at an end of the T-shaped slider to limit the position where the first lock body 1 and the second lock body 2 are docked in position.

Embodiment Eight

In this embodiment, the positions of the T-shaped guide rail and the T-shaped slider are exchanged on the basis of embodiment seven. Therefore, the T-shaped slider is arranged on the first lock body 1 and the T-shaped guide rail is arranged on the second lock body 2.

Embodiment Nine

The detachable structure is modified on the basis of embodiment seven.

The guide rail of an alternative shape can be employed to cooperate with the slider to form a detachable structure.

A buckle structure can be employed to form a detachable structure. In an example, a structure of a male buckle mated with a female buckle is employed.

Alternatively, fasteners can be employed to form a detachable structure, such as screws and threaded holes, or screws and nuts.

Embodiment Ten

In this embodiment, the arrangement of the first lock body 1 and the second lock body 2 is further illustrated on the basis of embodiment two.

As shown in FIG. 4, the first lock body 1 and the second lock body 2 can be arranged in an up-and-down fashion. That is, the first lock body 1 is the upper lock body and the second lock body 2 is the lower lock body.

Alternatively, the first lock body and the second lock body can also be arranged in a left and right fashion.

The docking of the two locking bodies can be made along a horizontal direction (as shown in FIG. 3), a vertical direction, or an inclined direction.

Embodiment Eleven

This embodiment further illustrates how the cable lock is locked on the basis of embodiment two.

As shown in FIGS. 3, 4, and 5, before locking, an end 31 of the steel cable 3 is fixed onto the first lock body 1, and the other end of the steel cable 3 is a free end 32.

As shown in FIGS. 3 and 6, after locking, the free end of steel cable 3 is firmly locked onto the second lock body 2.

The second lock body 2 is provided with a lock core 27. The free end 32 of the steel cable 3 can pass through the lock core 27 in a single direction, i.e., a first direction. As the steel cable 3 passes through lock core 27, lock core 27 firmly locks the steel cable 3 in a second direction opposite to the first direction. As such, unlocking would not be possible unless steel cable 3 is cut off.

The first lock body 1 is provided with a power microswitch 13 for triggering the power supply. The free end 32 of the steel cable 3 can pass through the first lock body 1. The power microswitch 13 is triggered when the steel cable 3 passes through the first lock body 1.

The free end 31 of the steel cable 3 passes through the first lock body 1 and then through the second lock body 2.

The first lock body 1 and the second lock body 2 are both provided with a through hole through which steel cable 3 passes.

The disclosure provides a disposable RFID component for a cable lock. The traditional integrated lock body is separated into two parts, in which one part is a relatively low-cost RFID component, and the other part is a relatively high-cost locating component. Thereby, the RFID component is disposable after a single use, and a new RFID component can be assembled with a recycled relatively high-cost locating component to form a new cable lock. As such, the locating function can be realized with reduced use cost as much as possible.

The above content is a further detailed description of some embodiments of the disclosure in conjunction with detailed embodiments, and it is not intended to limit the disclosure to these descriptions. For a person having ordinary skill in the art, various deductions or alterations can be made without departing from the concept of the disclosure, and these should be regarded as falling within the protection scope of the disclosure.

What is claimed is:

1. A disposable RFID component for a cable lock, comprising an RFID device and a lock body part, wherein the lock body part is a part of a complete lock body of the cable lock;
    wherein a detachable docking structure is provided on the lock body part,
    wherein the detachable docking structure is a T-shaped guide rail.

2. The disposable RFID component according to claim 1, wherein the detachable docking structure is a T-shaped slider.

3. The disposable RFID component according to claim 2, wherein an end of the T-shaped slider is provided with a position limit step.

4. The disposable RFID component according to claim 1, wherein the lock body part is provided with an inner cavity, and the RFID device is arranged within the inner cavity of the lock body part.

5. The disposable RFID component according to claim 4, wherein a battery is arranged within the inner cavity.

6. The disposable RFID component according to claim 5, wherein the lock body part is provided with a connector.

7. The disposable RFID component according to claim 6, wherein the connector is electrically connected with the battery and the RFID device respectively.

8. The disposable RFID component according to claim 7, wherein the connector is a pogo pin interface or an electrically conductive plate corresponding to the pogo pin interface.

9. The disposable RFID component according to claim 1, further comprising a metal cable, and an end of the metal cable is fixed onto the lock body.

10. The disposable RFID component according to claim 1, wherein the lock body part has a through hole through which a metal cable passes through.

11. The disposable RFID component according to claim 1, comprising a metal cable and a through hole through which the metal cable passes through, wherein the through hole and a fixed end of the metal cable are respectively arranged on a left side and a right side of the lock body part.

12. The disposable RFID component according to claim 11, wherein the metal cable is a steel cable.

13. The disposable RFID component according to claim 11, wherein the lock body is provided with a microswitch.

14. The disposable RFID component according to claim 11, wherein the lock body is provided with a lock core.

15. The disposable RFID component according to claim 14, wherein the lock core is arranged within the through hole.

16. The disposable RFID component according to claim 14, wherein the lock body is provided with a microswitch, and both the lock core and the microswitch are positioned at a same side of the lock body part.

17. The disposable RFID component according to claim 16, wherein the lock core is positioned at a same side as the microswitch, and is positioned at a lower end of the microswitch.

* * * * *